United States Patent
Baumann et al.

[15] 3,699,338
[45] Oct. 17, 1972

[54] OSCILLATING MONITOR FOR FISSILE MATERIAL

[72] Inventors: Norman P. Baumann; Charles E. Ahlfeld, both of Aiken, S.C.

[73] Assignee: The United States of America as represented by the United States Atomic Energy Commission

[22] Filed: Aug. 5, 1971

[21] Appl. No.: 169,227

[52] U.S. Cl...................................250/83.1, 250/84.5
[51] Int. Cl.................................................G01t 3/00
[58] Field of Search...........................250/83.1, 84.5

[56] References Cited

UNITED STATES PATENTS

| | | |
|---|---|---|
| 3,050,624 | 8/1962 | Janner......................250/83.1 |
| 3,388,253 | 6/1968 | Mills, Jr................250/84.5 X |
| 3,431,416 | 3/1969 | Jones, Jr. et al.......250/83.1 X |

*Primary Examiner*—Archie R. Borchelt
*Attorney*—Roland A. Anderson

[57] ABSTRACT

A device for monitoring fissile material has a neutron source that oscillates between a location near and a location remote from a neutron detector. The detector is adjacent to suspected fissile material and is shielded by hydrogenous material from the remote location. The detector output is transmitted to analytical instrumentation for determining prompt and delayed neutron count or the phase angle lag between measured neutron flux and the source oscillation. From these determinations, the reactivity of fissile fuel and the concentration of fissile material in deeply subcritical storage facilities can be obtained.

12 Claims, 5 Drawing Figures

INVENTORS
NORMAN P. BAUMANN
BY CHARLES E. AHLFELD

ATTORNEY: Roland A. Anderson

PHASE ANGLE

INVENTORS
NORMAN P. BAUMANN
BY CHARLES E. AHLFELD

ATTORNEY:

3,699,338

OSCILLATING MONITOR FOR FISSILE MATERIAL

BACKGROUND OF THE INVENTION

The present invention was made in the course of, or under, a contract with the United States Atomic Energy Commission.

1. Field of the Invention

Fissile material, such as uranium-233, uranium-235 or plutonium-239, is capable of capturing a neutron and splitting at the nuclear level to produce additional neutrons, e.g., about 2.5 neutrons for each fission of the uranium-235 nucleus. The fission neutrons produced are either prompt or delayed. More than 99 percent of the initial fission neutrons are prompt and are emitted within about $10^{-14}$ second after the fission event. The remaining delayed neutrons are emitted over a longer time interval and are of major importance in reactor control and reactivity measurements.

If a system can produce sufficient fission neutrons to sustain a chain reaction it is said to be critical. The relationship of a system to criticality may be expressed in terms of the effective multiplication factor $k_{eff}$, that is the ratio of the average number of neutrons produced by fission in each generation to the total number of corresponding neutrons absorbed by the fissile material or lost from the system. In a subcritical system $k_{eff}$ is less than 1.0 while a supercritical system has a $k_{eff}$ of more than 1.0. Another concept for measuring the criticality of a system is the reactivity. Reactivity is defined as the ratio of the excess effective multiplication factor ($k_{eff}$ - 1·) to the multiplication factor. Glasstone, Principles of Nuclear Reactor Engineering 4.17, D. Von Nostrand Co., Inc. 1955.

Reactivity monitoring is ordinarily accomplished in subcritical facilities by interrogating the system with an external source of neutrons. The neutron response is examined with respect to the external neutron source, to determine the criticality or reactivity of the system. Radiation measurements taken while the system is being interrogated by the external neutron source will provide an estimate of the total prompt neutron count; that is, the summation of all generations of prompt neutrons present less the losses. Immediately after the external source is extinguished or removed, radiation measurements can be employed to characterize the total delayed neutron count; that is, the summation of all generations of delayed neutrons present as multiplied by the system less the losses.

This invention relates generally to reactivity monitoring devices that have application in subcritical reactors or in facilities for storing fissile fuel material. In nuclear fuel receiving basins, for example, it is mandatory to maintain the reactivity at a safe level below critical. Also deeply subcritical waste storage tanks or vaults can be surveyed to provide early detection of concentration gradients or accumulation of fissile material.

2. Description of Prior Art

Prior reactivity monitoring devices have employed pulsed neutron sources such as a small accelerator producing neutrons from deuterium-tritium T (D,n)$^4$He reactions. Such a source can repetitively generate neutron pulses of very short duration, e.g., from a few microseconds to milliseconds. Each pulse decays within fissile material in a complex exponential mode that requires sophisticated data analysis components to determine the reactivity of the system. A multichannel time analyzer is usually required for accurate resolution. Formidable operating and maintenance problems can arise from both the complex instrumentation and the accelerator itself. For instance, tritium target material has a limited life and requires replacement only after about 2 hours of "on" time (typically 20 to 50 hours total experimental time).

SUMMARY OF INVENTION

Therefore, it is an object of the present invention to provide an accurate monitor for fissile material having an extended service life and minimal maintenance requirements.

It is a further object to provide a reactivity monitor having simplified data analysis components.

It is also an object to provide a monitor for assaying very low level concentrations of fissile material in hydrogenous environments such as in waste storage systems.

In accordance with the present invention there is provided a monitor for fissile material having an isotopic neutron source affixed to a device for oscillating the source between a location proximate to a neutron detector and a location remote from the neutron detector. In one manner of carrying out the present invention, the neutron source is delayed in both the proximate and remote locations for a first and a second time interval, respectively, to produce an approximate square wave neutron flux at the detector. Dual counters or scalers are coupled to the amplified detector output and are separately activated by a gate circuit in synchronization with the source oscillation. The scaler activated while the source is delayed in the proximate location gives a reading that is used to determine the total prompt neutron count. The other scaler is activated while the source is delayed in the remote location and its reading is employed to obtain the total delayed neutron count. From the ratio of the total delayed neutrons to the total prompt neutrons the reactivity of the system can be computed. In deeply subcritical systems the total delayed neutron count taken at different locations can give an estimate of the relative concentration of fissile material at the different locations.

In another embodiment of the present invention, the neutron source is affixed to a member for continuous oscillation at a known frequency to produce a sinusoidal neutron flux oscillation in respect to the radiation detector. The oscillation can be produced either by rotation about an axis or by continuous reciprocal motion to and from both the fissile material and the detector. The neutron response of the system is measured and its wave form compared with that of the oscillating source. The phase angle lag of the system's neutron response behind that of the oscillating source indicates the reactivity of the system especially in near critical facilities.

DESCRIPTION OF THE DRAWINGS

The present invention is illustrated in the accompanying drawings wherein.

DETAILED DESCRIPTION OF THE PREFERRED EMBODIMENT

Figure 1:
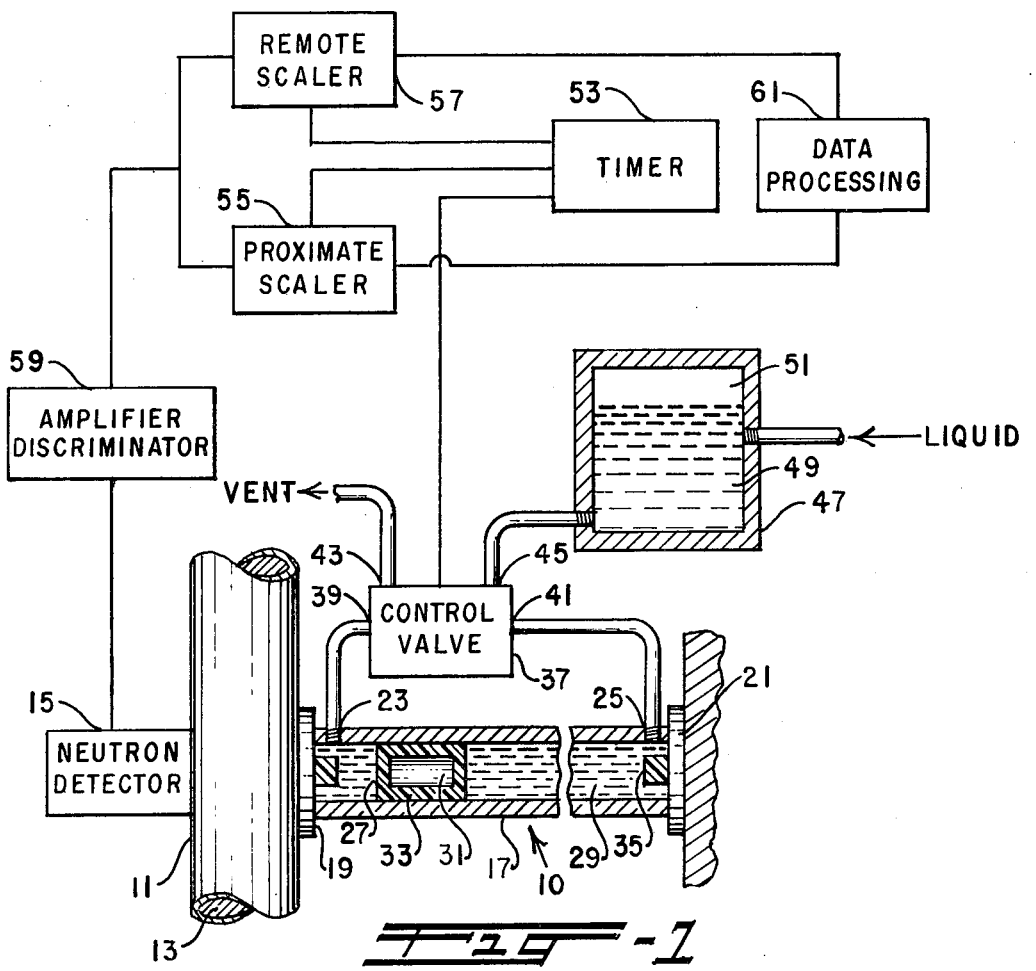
FIG. 1 is a schematic view of an oscillating reactivity monitor employed in conjunction with nuclear fuel.

Referring now to FIG. 1, a nuclear fuel element 11 containing fissile material 13 is shown to represent one element of a fuel element array as might be found in a fuel storage or receiving basin. A reciprocating motor 10 for oscillating a neutron source is supported with one end 19 mounted proximate to or against fuel element 11 and the opposite end 21 supported in a remote location. A neutron detector 15, such as a BF$_3$ gas filled proportional counter, is located against or near fuel element 11 or a neighboring fuel element. Although detector 15 and motor 10 can be mounted on the same fuel element as shown, in a complex fuel element array more accurate measurements may be obtained by mounting motor 10 on a peripheral fuel element and detector 15 on a fuel element towards the center or opposite side of the array. In most arrangements detector 15 is mounted at a fuel element surface opposite to motor 10 to minimize detection of neutrons from the source before their interaction with the fissile materials.

Reciprocating motor 10 includes an elongated cylinder 17 with an axial passageway 29 containing a movable shuttle 27. Shuttle 27 is formed with an encapsulated neutron source 31 enclosed within an outer plastic layer 33, such as teflon (polytetrafluoroethylene). Source 31 can include a quantity of californium-252 that emits neutrons by spontaneous fission or other isotopic neutron source. For instance a plutonium-beryllium or antimony-beryllium source that produces neutrons by nuclear reaction could be employed.

Ports 23 and 25 are provided in cylinder 17 to admit and discharge hydraulic fluid into passageway 29 to oscillate the shuttle 27 between a location proximate to and a location remote from the neutron detector 15. The hydraulic fluid is a hydrogenous liquid, such as water, to shield the neutron source 31 from the fuel element 11 and the detector 15 whenever the shuttle 27 is at the remote location, that is, near end 21. Cylinder 17 should be of sufficient length to allow a neutron count rate ratio of about 160:1 between the proximate and remote locations. In most instances, the neutron source will travel 30 centimeters or more between these locations in a water filled system.

Plastic or rubber-like cushions 35 absorb the shock and momentum of shuttle 27 as it is oscillated to and from the proximate and remote ends of cylinder 17. It is preferable that shuttle 27 be stopped at each end by an inelastic collision with the cushion 35 to prevent bounce or fluttering of the neutron source at the end locations.

A control valve 37 regulates the flow of water to cylinder 17 and can be a conventional electrically operated four-way solenoid valve having two positions and four ports. Ports 39 and 41 are connected to ports 23 and 25 respectively of the hydraulic cylinder 17 and ports 43 and 45 are coupled to a vent and a pressurized water or liquid supply. When valve 37 is in the first position port 39 communicates with port 43 and port 41 communicates with port 45 to vent the proximate end of cylinder 17 while pressurizing the remote end. Consequently shuttle 27 is forced to the proximate location adjacent end 19. When the valve is switched to the second position the port communications are reversed to drive the shuttle 27 to the remote end of the cylinder 17. It will be apparent to those skilled in the art that alternate valving arrangements can be utilized to oscillate shuttle 27 within cylinder 17.

The water supply coupled to port 45 of control valve 37 is equipped with a pneumatic shock absorbing or buffer tank 47. Tank 47 is pressurized and partially filled with water or other hydrogenous liquid 49 with an air space 51 left at the top. Air space 51 absorbs the hydraulic shock and resulting vibrations produced as control valve 37 is switched from one position to the other.

The oscillation of control valve 37 is electrically controlled by an ordinary cyclic timer device 53 that provides an "on" signal for a first time interval followed by an "off" signal for a second time interval. These "on" and "off" signals can be any of various electrical signals such as the presence or absence of an electric current to energize or deenergize a solenoid within valve 37.

Timer 53 also controls the operation of two pulse counters or scalers 55 and 57. The scalers are conventional high frequency counting devices that are often used with pulse output radiation detectors. Each scaler is activated by an internal switching device electrically coupled to timer 53. The proximate scaler 55 is activated and allowed to count or register only while shuttle 27 is in the proximate location and the remote scaler 57 registers only while the shuttle is in the remote location. It may be desirable to slightly delay the signal from timer 53 to each scaler after the signal to the control valve 37 is transmitted to allow the shuttle to reach its destination before activating the corresponding scaler.

The neutron count signal from detector 15 is amplified and biased in an amplifier-discriminator 59 and transmitted to both proximate and remote scalers 55 and 57 where it is separately registered. The output of the two scalers is transmitted to a data processing system 61 that can be a small computer device. If such a device is not available, an operator can be employed to take readings and do minor calculations to determine the reactivity of the nuclear fuel array.

Figure 2:
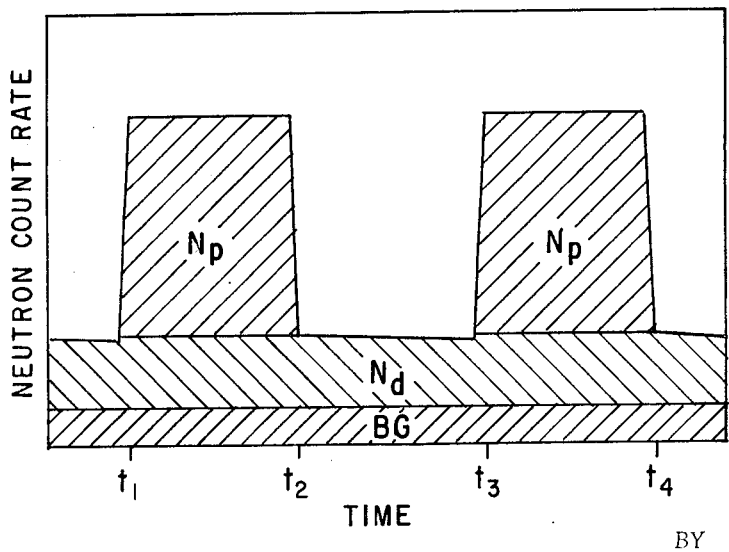
FIG. 2 is a graphic illustration of the neutron response of the system in FIG. 1.

In operating the reactivity monitor of FIG. 1 a signal representing neutron count is alternately transmitted to the two scalers 55 and 57 from the neutron detector 15. In FIG. 2, $t_1$ corresponds to the time when shuttle 27 arrives in the proximate location and the proximate scaler is activated to register neutron count. Time, $t_2$ corresponds to when the shuttle arrives in the remote location, the remote scaler 57 is activated and the proximate scaler is inactivated. At $t_3$ the system returns to the status described in conjunction with $t_1$, etc.

The areas labeled $N_P$ under the waveform in FIG. 2 correspond to the total prompt neutron count contribution to the neutron detector 15 output. The vertical sides of areas labeled $N_P$ are slightly sloped inwardly due to the finite time required for shuttle 27 to travel the length of cylinder 17. It is desirable to keep this travel time and slope at a minimum so these areas may be treated as rectangles. This will become apparent upon examination of Equations 2 and 3 given below. The area labeled $N_d$ corresponds to the total delayed neutron count which also includes prompt neutrons that are released from fission events produced by delayed neutrons of a previous generation. Expressed differently, the delayed neutron count is multiplied by the fissile material within the fuel element array. The wave form between $t_2$ and $t_3$ is slightly sloped downwardly due to the decay of the total delayed neutron count rate within the fissile material while the neutron source 31 is in the remote location. Since Area $N_d$ like Area $N_P$ is treated as a rectangle in Equations 2 and 3 below, $t_3 - t_2$ should not be large in respect to $t_2 - t_1$ minimize this decay. Background count is also shown in FIG. 2 in the area designated BG and must be measured and deducted from both scaler readings to obtain an accurate reactivity determination.

Reactivity can be computed in subcritical systems from the following equation found in Sjostrand, "Measurements on a Subcritical Reactor Using a Pulsed Neutron Source," Ark. Fys., 11, 234 (1956). $\rho = -\beta_{eff} (N_p/NA \times d)$
where:

$\rho$ — is the reactivity of the system $\beta_{eff}$ — is the effective fraction of delayed neutrons to total neutrons emitted in each fission event averaged over numerous fission events. The actual fraction of delayed neutrons, $\beta$, is a constant for each type fissile material, but since prompt neutrons have an average energy that is substantially greater than the average energy of delayed neutrons, more prompt neutrons are lost from the system. Consequently a slight correction based on diffusion theory calculations for the particular nuclear fuel array can be made if the added accuracy is desired. Keepin, Physics of Nuclear Kinetics, 172–185, Addison-Wesley Publishing Co., Inc. (1965).

$N_p$ — is the total prompt neutron count, and $N_d$ — is the total delayed neutron count.

It is apparent from an inspection of FIG. 2 that values for $N_p$ and $N_d$ can be estimated from the scaler readings in the following equations:

$$N_d = \left(1 + \frac{t_2 - t_1}{t_3 - t_2}\right) n_r \qquad \text{Eq. 2}$$

$$N_p = n_p - \left(\frac{t_2 - t_1}{t_3 - t_2}\right) n_r \qquad \text{Eq. 3}$$

where:

$n_r$ is the remote scaler count after background correction $n_p$ is the proximate scaler count after background correction $t_2 - t_1$ is the time interval while the neutron source is in the proximate location $t_3 - t_2$ is the time interval while the neutron source is in the remote location.

It has been found that for a system containing U-235 fissile material that the reactivity monitor is optimumly programmed with $t_2 - t_1$ and $t_3 - t_2$ both being about equal to 1 second. This value is selected because it is between the maximum average prompt neutron decay time of about 0.1 second and the average delayed neutron lifetime of about 10 seconds in a subcritical U-235 nuclear fuel system. Both time intervals should be about equal to obtain maximum sensitivity from a given source.

Figure 3:
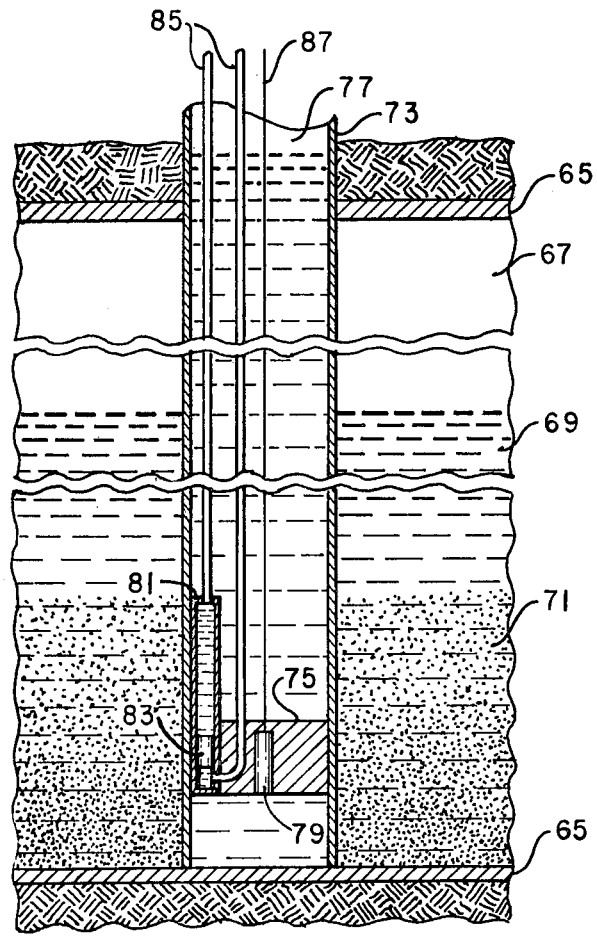
FIG. 3 is a schematic view of an oscillating monitor for assaying fissile material in a waste storage or like system.

Referring now to FIG. 3, a portion of an underground nuclear waste basin or tank 65 is shown with an air space 67, a supernatant liquid layer 69 and a layer of radioactive sludge material 71 containing both liquid and solid material. A standpipe or conduit 73 extends from an accessible external location to the bottom of tank 65 and is sealed from the radioactive material and liquid contained within the tank. A solid cylinder or disk 75 of gamma shielding material, for instance lead, is movably fitted within the internal passageway 77 of conduit 73 and is shown positioned above the bottom of tank 65. A neutron detector 79, such as a $^{235}U$ fission chamber, is diametrically centered within disk 75. The disk material shields detector 79 from gamma radiation but allows most neutron radiation to pass. The output of detector 79 is transmitted to instrumentation at the surface through electrical cable 87 that can be enclosed in a protective conduit (not shown). The conduit or other suitable means can be employed to raise, lower and support disk 75 within passageway 77.

A hydraulic cylinder 81 is attached at its lower portion into the outer circumference of disk 75 adjacent and generally parallel to the wall of conduit 73. A shuttle 83 bearing a neutron source is slidably disposed within the internal passageway of cylinder 81. Hydrogenous liquid is alternately supplied under pressure through each of the two tubes 85 to oscillate shuttle 83 between the remote and proximate ends of cylinder 81 in respect to detector 79. Cylinder 81 is of sufficient length to provide a neutron flux ratio of about $10^6$ to 1 at detector 79 as shuttle 83 is moved from the proximate to the remote end. For example, a cylinder length of about one meter was found to be sufficient in a water filled system employing a $^{252}Cf$ neutron source. Suitable hydraulic and timer components as shown in FIG. 1 are provided to control the oscillation of the neutron source held within shuttle 83 and the output of neutron detector 79 is transmitted to instrumentation similar to that shown in FIG. 1.

Waste storage basins, as shown in FIG. 3, usually contain only deeply subcritical concentrations of fissile material and consequently reactivity measurements as described above greatly overestimate $N_p$ in Equation 1. However, useful information can be obtained by comparing the total delayed neutron count ($N_d$) given in Equation 2 above at various levels or regions especially throughout the sludge layer 71. Should fissile material be accumulating in any region within the waste tank, it can be detected and remedied long before a dangerous concentration level can occur.

Although this embodiment of the present invention is illustrated and described with respect to a neutron detector and neutron source moved vertically between levels or regions within a waste storage tank, it will be clear that this embodiment is equally applicable to any vault or chamber for storing material that may contain fissile values. The oscillating neutron source and detector unit can be installed to move horizonally, vertically or in other patterns between regions of a mass where fissile material is contained and possibly concentrated.

Figure 5:
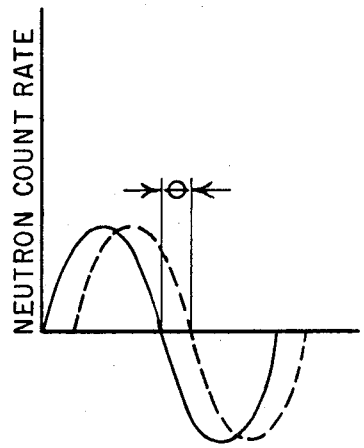
FIG. 5 is a graphic representation of the oscillation frequency and the neutron response of the system shown in FIG. 4.
Figure 4:
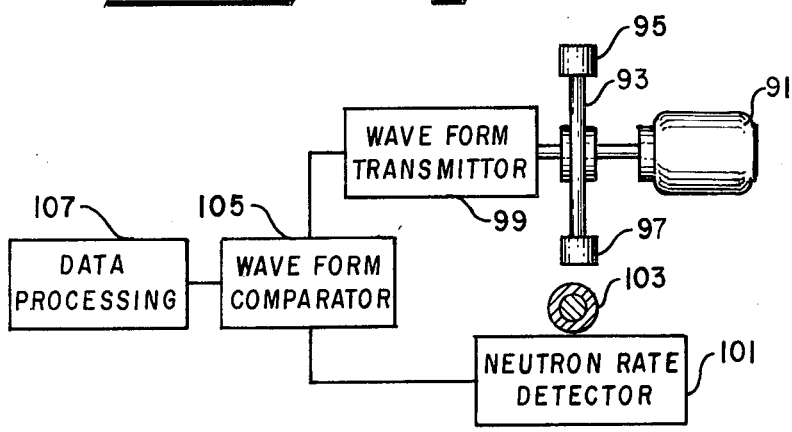
FIG. 4 is a schematic plan view of an oscillating monitor having a rotating member for use in near critical facilities with high background neutron levels.

FIGS. 4 and 5 illustrate another embodiment of the present invention that has application in near critical facilities such as a reactor as it is being brought toward criticality. A rotary motor 91 drives a rotatable member 93 with an encapsulated neutron source 95 mounted opposite a balancing mass 97. Motor 91 is preferably a variable speed type or an ordinary electric motor provided with a variable speed drive to allow adjustment of the oscillation frequency of source 95. Mass 97 is about equal to that of the encapsulated source 95 and has matching neutron absorption characteristics. Thus both the mechanical rotation of member 93 and the effect on the neutron flux of the reactor contributed by neutron absorption in the rotating components are balanced.

A neutron count rate detector 101 is disposed on or near an opposite surface of a nuclear fuel element 103 from rotatable member 93 and neutron source 95. The rotation of member 93 in the vicinity of fuel element 103 generates a sinusoidal neutron flux by the interaction of the rotating neutron source 95 and the fissile material within the fuel element. Detector 101 senses this varying neutron flux and transmits a signal represented by the dashed curve of FIG. 5 to a wave form comparitor 105. The detector 101 can be a conventional boron lined ionization chamber operating in the current mode or a conventional fission chamber operating in the pulse mode and connected to a count rate circuit.

A wave form transmitter 99 is shown mechanically connected to sense the rotation of member 93 and generate a wave form as represented by the solid curve in FIG. 5. If an electric motor is used at 91 and a mechanical variable speed drive is not interposed between the motor and rotable member, an electrical signal from the motor's windings can be sensed to represent this wave form. Otherwise, wave form transmitter 99 can be a tachometer type device connected to a suitable electric generator. The output from transmitter 99 is phase oriented so that a maximum (see the solid curve of FIG. 5) is achieved when neutron source 95 is in the most proximate location to neutron rate detector 101 and fuel element 103. Similarly a minimum is reached when the neutron source is in the most remote location in respect to the detector and nuclear fuel. Consequently wave form transmitter 99 produces a reference signal which corresponds to the neutron count rate that would be sensed by detector 101 if the nuclear fuel were not present. This output is transmitted to wave form comparator 105 along with the output of neutron count rate detector 101. Wave form comparator 105 can be a conventional "zero-crossover" type which determines the difference in time between respective zero-crossovers of reference and detector signals, i.e., the end points for angle $\theta$ shown in FIG. 5.

The phase lag of the neutron response of the system behind that of the reference signal from the rotating neutron source is due to the delay between neutron emission from source 95 and prompt neutron emissions resulting from fission of the nuclear fuel. A signal representative of the phase lag angle $\theta$ is transmitted from wave form comparator 105 to data processing system 107. As in FIG. 1, data processing can be accomplished with a computer type device or if not available by an operator who takes readings and performs minor calculations.

The shutdown margin of the reactor $1 - k_{eff}$ for subcritical systems is given closely by the following relation.

$$1 - k_{eff} = 2\pi f l_p \cot(\theta) - \beta$$

where:
  $k_{eff}$ — the effective multiplication factor
  $f$ — the frequency of the neutron source oscillation
  $\theta$ — the angle of the phase lag between neutron response of system and the source oscillation
  $l_p$ — the prompt neutron lifetime
  $\beta$ — the delayed neutron fraction.

The quantities $l_p$ and $\beta$ are properties of the multiplying system and can usually be estimated to sufficient accuracy for reactivity monitoring. The frequency of the source oscillation will be known from the characteristics of motor 91 or can be easily measured with a tachometer. It is useful to be able to adjust the frequency so that $\theta$ will be about 45° to facilitate discrimination between the two wave forms shown in FIG. 5.

As an alternate arrangement, the rotating neutron source in FIG. 4 can be replaced with a continuously reciprocating source similar to those shown in FIGS. 1 and 3. Instead of delaying the neutron source in the proximate and remote locations as explained above, a sinusoidal effect could be approximated by continuously oscillating the source back and forth through a hydrogeneous media. If a neutron source employing a nuclear reaction between elements is used, such as an antimony and beryllium source, then for instance an antimony shuttle could be continuously oscillated in and out of a beryllium sleeve.

The present invention provides an accurate fissile material or reactivity monitor that requires minimal maintenance. Its several embodiments can be used to assay fissile material in a deeply subcritical waste tank, and monitor reactivity in a fuels storage basin or a near critical reactor. Complex multichannel pulse-time analyzers are unnecessary for collecting and processing the information generated within the system and only simple computations are required to obtain the characteristics of the system from the measured variables.

What is claimed is:

1. A device for monitoring fissile material comprising:
   a. an isotopic neutron source
   b. a neutron detector disposed adjacent to said fissile material
   c. oscillatory means for moving said neutron source between a location proximate to said neutron detector and a location remote from said neutron detector.

2. The device of claim 1 wherein there is included counting means for separately registering the output of said neutron detector when said neutron source is proximate to said detector and when said neutron source is remote from said detector.

3. The device of claim 1 wherein said oscillatory means comprises a reciprocative motor linked to said neutron source for repetitively positioning said neutron source in said proximate location for a first time interval and then in said remote location for a second time interval to produce an approximate square wave neutron flux variation at said detector.

4. The device of claim 3 wherein said reciprocative motor comprises an elongated cylinder having an axial shuttle bearing said neutron source and hydraulic means for reciprocating said shuttle between the ends of said cylinder; said cylinder being fixedly attached at one end thereof proximate to said neutron detector; and movable means are included for relocating said cylinder and neutron detector in respect to said fissile material.

5. The device of claim 1 wherein said neutron detector and said oscillatory means are disposed at oppositely facing surfaces of said fissile material.

6. The device of claim 1 wherein liquid hydrogenous material is disposed between said proximate and remote locations and said remote location is at a distance of about 30 to 100 centimeters from said proximate location.

7. The device of claim 1 wherein said oscillatory means comprises a rotatable member having said neutron source affixed to a distal portion thereon, and a rotary motor for continuously revolving said neutron source through said proximate and remote locations to produce an approximate sinusoidal neutron flux variation at said detector.

8. A method of monitoring fissile material comprising:
 a. disposing a neutron detector adjacent to said fissile material;
 b. oscillating a neutron source between a location proximate to said neutron detector and a location remote from said neutron detector to produce a cyclic neutron flux; and
 c. sensing said cyclic neutron flux with said neutron detector.

9. The method of claim 8 wherein the reactivity of said fissile material is monitored by:
 a. reciprocating said neutron source between said proximate and remote locations in respect to said neutron detector;
 b. delaying said neutron source in said proximate location for a first time interval and in said remote location for a second time interval;
 c. separately registering the output of said neutron detector during said first and during said second time intervals; and
 d. determining the ratio of total prompt neutrons to total delayed neutrons and the reactivity of said fissile material from the output of said neutron detector during said first and said second time intervals.

10. The method of claim 8 wherein the relative concentration of said fissile material in different regions of a mass containing said fissile material is monitored by:
 a. positioning said neutron source and neutron detector in a first region;
 b. reciprocating said neutron source between said proximate and remote locations in respect to said neutron detector;
 c. delaying said neutron source in said proximate location for a first time interval and in said remote location for a second time interval;
 d. registering the output of said neutron detector during said second time interval;
 e. moving said neutron detector and neutron source to a second region and repeating steps (b)–(d); and
 f. comparing the output of said neutron detector during said second time interval in said first region with the corresponding output in said second region.

11. The method of claim 8 wherein the reactivity of said fissile material is monitored by:
 a. continuously oscillating said neutron source between said proximate and remote location in respect to both said neutron detector and said fissile material to produce a sinusoidal neutron flux at said detector;
 b. monitoring the oscillation of said neutron source to produce a reference signal; and
 c. comparing the wave form phase of said neutron flux with the wave form phase of said reference signal to determine the phase angle lag and the reactivity of said system.

12. The method of claim 11 wherein said step of continuously oscillating said neutron source is accomplished by rotating said source through said proximate and remote locations at a frequency that produces a phase angle lag of about 45°.

* * * * *